(12) United States Patent
Banerjee et al.

(10) Patent No.: US 10,742,635 B2
(45) Date of Patent: Aug. 11, 2020

(54) MULTILEVEL SIGN-ON

(71) Applicant: American Express Travel Related Services Company, Inc., New York, NY (US)

(72) Inventors: Debdeep Banerjee, Phoenix, AZ (US); Yatharth Chowdhary, Phoenix, AZ (US); Dinesh Reddy Gudibandi, Phoenix, AZ (US); Gautam Gulati, Phoenix, AZ (US); Prasanth Harpanahalli, Scottsdale, AZ (US); Edward L. Morabito, Jr., Scottsdale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 191 days.

(21) Appl. No.: 15/984,607

(22) Filed: May 21, 2018

(65) Prior Publication Data
US 2019/0356647 A1 Nov. 21, 2019

(51) Int. Cl.
*H04L 29/06* (2006.01)
*G06F 9/451* (2018.01)

(52) U.S. Cl.
CPC ......... *H04L 63/0815* (2013.01); *G06F 9/451* (2018.02)

(58) Field of Classification Search
CPC ............................ H04L 63/0815; G06F 9/451
USPC ............................................................ 726/8
See application file for complete search history.

(56) References Cited

U.S. PATENT DOCUMENTS

| | | | | |
|---|---|---|---|---|
| 9,563,644 | B1* | 2/2017 | Castillo | G06F 16/9537 |
| 2009/0282192 | A1* | 11/2009 | Maus | G06Q 20/105 |
| | | | | 711/115 |
| 2010/0121701 | A1* | 5/2010 | Nguyen | G06Q 20/20 |
| | | | | 705/14.38 |
| 2012/0109737 | A1* | 5/2012 | Setty | G06Q 30/0242 |
| | | | | 705/14.41 |
| 2018/0121175 | A1* | 5/2018 | Melvin | G06F 8/38 |

* cited by examiner

*Primary Examiner* — Khalil Naghdali
(74) *Attorney, Agent, or Firm* — Thomas | Horstemeyer, LLP (57) ABSTRACT

A global userID may be linked to many individual locations. A user may login to the global userID and select an experience environment. The experience environment may provide access to locations associated with the experience environment, such as all locations in a country. The user may switch between experience environments without providing login credentials for each individual location the user wishes to view.

20 Claims, 5 Drawing Sheets

MULTILEVEL SIGN-ON

FIELD

This disclosure generally relates to data privileges, and more particularly, to credential authentication for data privileges.

BACKGROUND

Global entities (e.g., multi-national corporations) may include many physical locations, often spread throughout many different countries. An employee wishing to access digital information provided by a service provider may be required to enter a separate login for each location or each region. For example, a service provider may be a transaction account issuer, and an employee may wish to view information regarding disputed transactions. In order to switch between the disputed transactions occurring at different locations, the employee may be required to logout from a dispute application and log back in to the dispute application with different credentials. Additionally, the login information for one location would often be shared among multiple users in order to access the location information, which creates inefficiencies and security risks.

SUMMARY

Systems, methods, and articles of manufacture (collectively, the "system") for providing access to data for multiple locations are disclosed. The system may perform operations including: creating a global user identification; linking the global user identification with a plurality of individual locations; receiving a selection of an experience; identifying a subset of the individual locations, wherein the subset is associated with the selected experience; generating a graphical user interface tailored to the selected experience; and presenting, in the graphical user interface, data for the subset of the individual locations.

In various embodiments, the operations may comprise receiving a selection of a different experience. The system may identify a different subset of the individual locations, wherein the different subset is associated with the different experience. The system may generate a second graphical user interface tailored to the different experience, and present data for the different subset. The second graphical user interface may be generated without receiving additional login credentials. The experience may identify a country in which the subset of locations are located. The experience may specify a currency for the subset of locations.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems and methods are provided which allow a user to easily switch between experience environments in an application portal without providing different credentials (or with a reduced amount of credentials). A global userID may be linked to many individual locations. A user may login to the global userID and select an experience environment. The experience environment may provide access to locations associated with the experience environment, such as all locations in a country. The user may switch between experience environments without providing login credentials for each individual location the user wishes to view.

This process improves the functioning of the computer. For example, by providing data access in the described methods, both the user and the system are able to avoid many login attempts, both successful and unsuccessful, as well as avoid the necessity to maintain large numbers of login credentials, which saves on data storage and memory, which in turn speeds processing. With the use of this method, the user may be able to quickly and efficiently accomplish their intended task and reduce the computational time, overhead, and resource usage (e.g. memory, cpu, battery) on the user device and the system processors.

Figure 1:
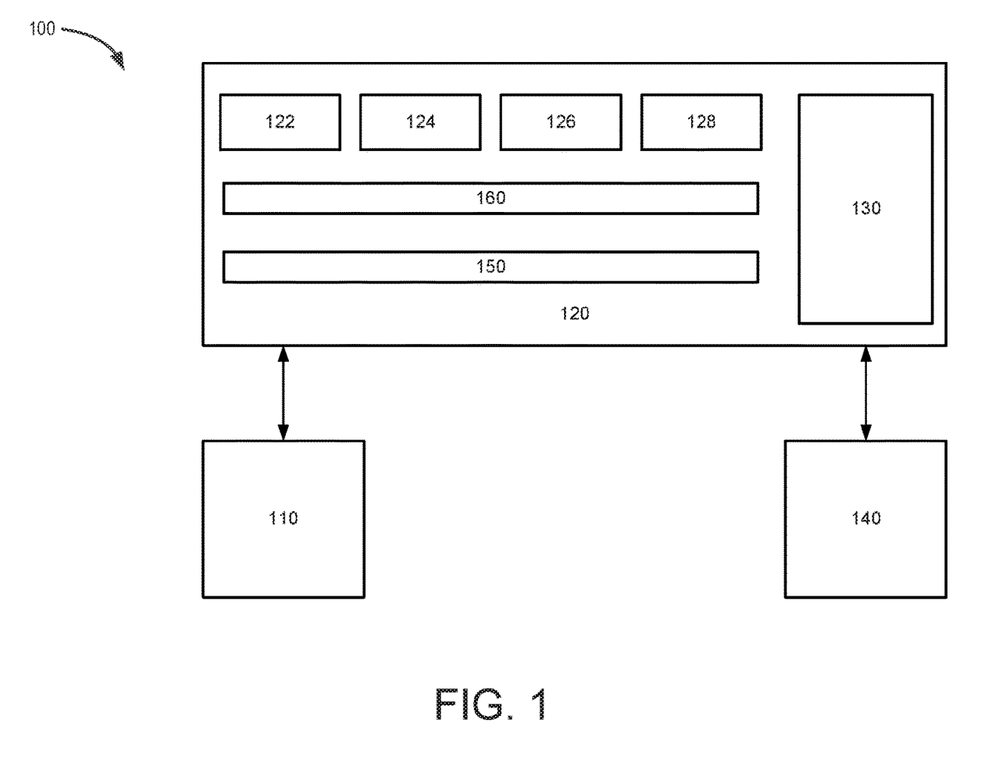
FIG. 1 is a block diagram illustrating a system for global user login, in accordance with various embodiments.

Referring to FIG. 1, a block diagram of a system 100 for global user login is illustrated according to various embodiments. A global user client 110 may access one or more applications in an application portal. In various embodiments, the application portal may run on a cloud network 120. However, in various embodiments the application portal may run on local servers. The application portal may provide a variety of services to the global user client. For example, a first application 122 may be a payments application which provides information on recent payments received by a location. A second application 124 may be a disputes application that provides information on transactions currently under dispute. A third application 126 may be a supplies application that provides an interface to order supplies for a location. A fourth application 128 may be a lending application, which allows the user to request business loans. The system 100 may comprise any number of applications which provide a wide variety of services.

The system may comprise a datastore 130. The datastore 130 may store data and make the data accessible to the applications. In various embodiments, the datastore 130 may be a cloud-based datastore. However, in various embodiments, the applications may access data from a local database 140, such as a mainframe database, or a combination of local and cloud-based databases.

The system 100 may comprise a global login filter 150. The global login filter 150 may allow the global user to select between different experiences. In various embodiments, each different experience may represent a different country or region. For example, a first experience may represent the United States, a second experience may represent India, and a third experience may represent a multi-currency experience. In response to the global user selecting a different experience, the system may provide different functions or interfaces to the global user.

The system 100 may comprise an experience manager 160. In response to the user selecting an experience from the global login filter 150, the experience manager 160 may provide access to the appropriate applications and data for the experience. For example, some countries do not allow disputes. For such countries, the experience manager 160 would not provide access to the second application 124, as a disputes application would not be relevant. Additionally, the experience manager 160 may only provide access to data for the locations which are applicable to the selected experience. For example, when the global login filter 150 is selected to provide an experience corresponding to India, the experience manager would only provide access to data for locations in India.

Figure 2:
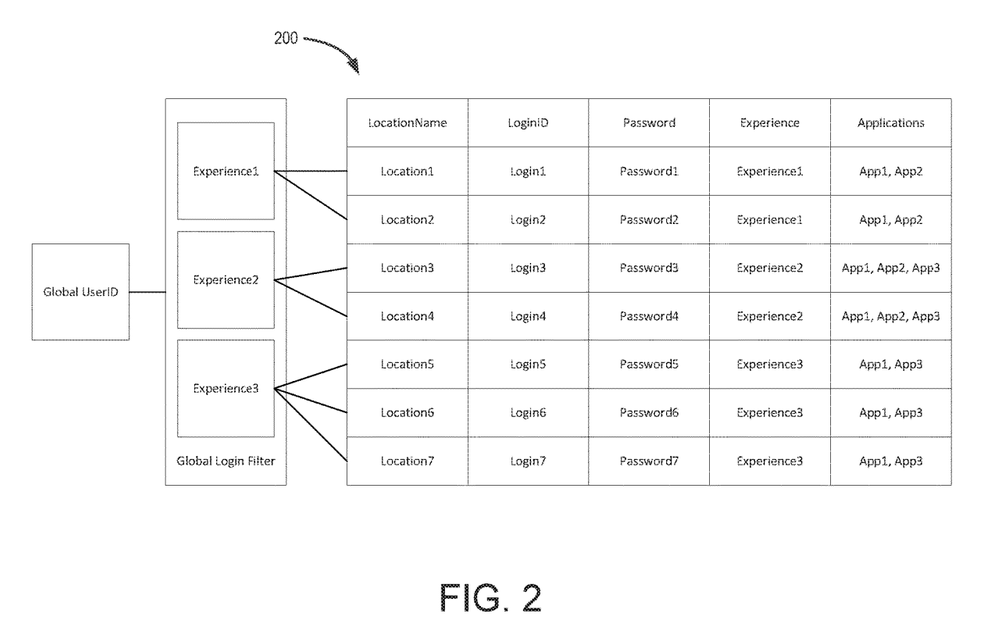
FIG. 2 illustrates a location table, in accordance with various embodiments.

Referring to FIG. 2, a location table 200 is illustrated according to various embodiments. The global user may be linked to a plurality of specific locations, which indicates that the global user has permission to access the data for the plurality of individual locations. The location table 200 may comprise information for each location accessible by the global user. For example, the location table 200 may comprise variables such as LocationName, LoginID, Password, Experience, Applications, etc. As previously described, prior art systems may have required a different LoginID and Password for each location. In various embodiments, the location table 200 may still maintain the location specific LoginID and Password; however, in various embodiments, the location table 200 may no longer comprise the location specific LoginID and Password.

The Experience variable may describe what experience should be provided for the listed location. The experience may include which applications are provided, the language of text, the currency, the specific locations provided, etc. In various embodiments, the location table 200 may include an Applications variable which describes which applications should be made available for each location or experience. For example, Location1 and Location2, which are in Experience1, may utilize a first application and a second application. However, Location5, Location6, and Location7, which are in Experience3, may utilize a first application and a third application, but not the second application. For example, Experience3 may represent India, and the dispute application may not be relevant in India, where disputes are not permitted.

Rather than providing different login credentials to access each specific location, the user may provide a single set of login credentials for the Global UserID. Once logged in to the Global UserID, the user may select a specific experience from the global login filter. In response to selecting a specific experience, the user may have access to data for the locations associated with that experience. For example, in response to the user selecting Experience 1, the user may have access to the data for Location1 and Location2. Additionally, the data for Location1 and Location2 may be presented according to the style and format defined by the experience manager for Experience1. Should the user wish to view the data for Location5, Location6, and Location 7, the user could select Experience3, and the experience manager may provide the data for Location5, Location6, and Location7 in the style and format of Experience3, without requiring the user to provide additional login credentials.

Figure 3:
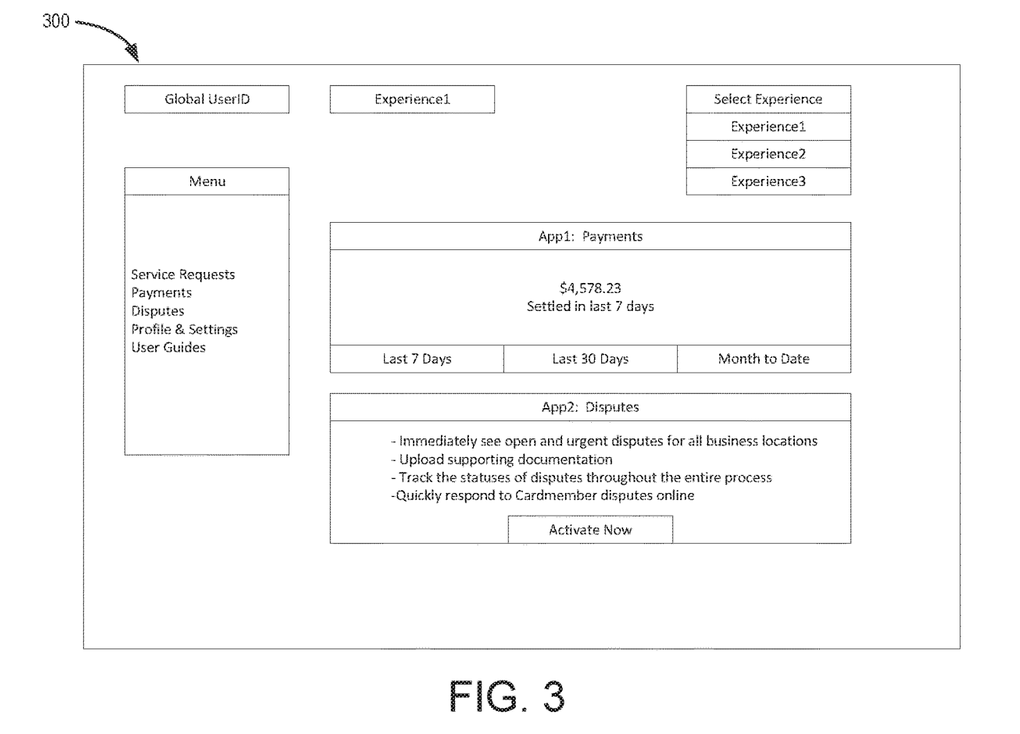
FIG. 3 illustrates a screen shot of an application portal in a first experience environment, in accordance with various embodiments.

Referring to FIG. 3, a screenshot of a graphical user interface (GUI) 300 for an application portal in a first experience is illustrated according to various embodiments. The GUI 300 may identify the user logged into an application portal. The GUI 300 may identify the currently selected experience. As illustrated, the user is currently in Experience1. The GUI 300 may comprise a list of available experiences. For example, a drop down menu may list Experience1, Experience2, and Experience3 as experiences available to the user.

The GUI 300 may display applications available to the user. For example, a first application may be a payments application which provides information on recent payments received by a location. A second application 124 may be a disputes application that provides information on transactions currently under dispute. The GUI 300 may provide a menu of applications and other available functions, such as settings, etc.

The Experience1 may correspond to a country, such as the United States. As such, the currency may be expressed in dollars, and the provided applications may be those which are relevant in the United States. Additionally, the provided data, such as the $4,578.23 payment amount, may be for the locations in the United States.

Should the user wish to view data for a different country, the user may simply select the experience corresponding to the country from the experience menu. For example, the user may wish to see data for locations in India, and the user may select Experience2 which corresponds to India. The GUI 300 may display the data for India locations (as shown in FIG. 4) without requiring the user to enter separate login credentials.

Figure 4:
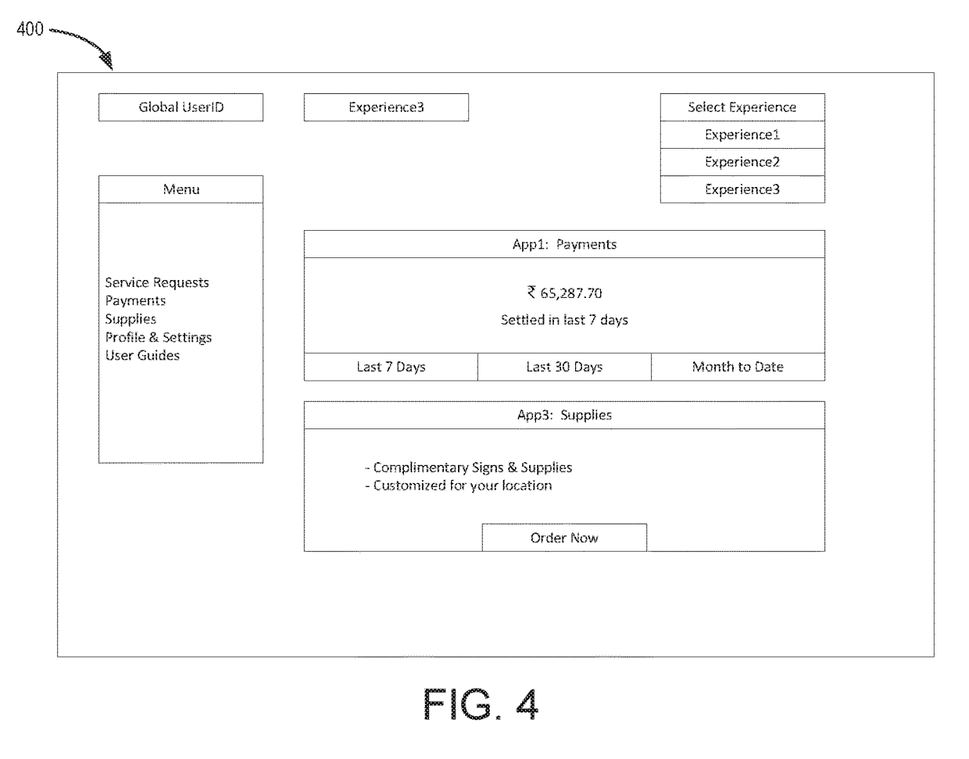
FIG. 4 illustrates a screen shot of an application portal in a second experience environment, in accordance with various embodiments.

Referring to FIG. 4, a screenshot of a graphical user interface (GUI) 400 for the application portal in a second experience is illustrated according to various embodiments. The user may have been in Experience1, as shown in FIG. 3, and selected Experience3 in order to access data for the locations associated with Experience3, as shown in FIG. 4. In various embodiments, Experience3 may represent India. Thus, the GUI 400 may not include the disputes application shown in FIG. 3 with respect to Experience1. The GUI 400 may include applications which are relevant to Experience3, which may include a payments application and a supplies application.

The GUI 400 may display the data for the locations associated with Experience3. Additionally, the data may be localized for the locations. For example, the payments data may be shown in Indian rupees. In various embodiments, the GUI 400 may display the content in a language associated with the Experience3, such as Hindi. In various embodiments, the language may be initially determined based on an IP address of the user accessing the data. However, the user may set a default language for one or all experiences, or the user may toggle between languages.

Figure 5:
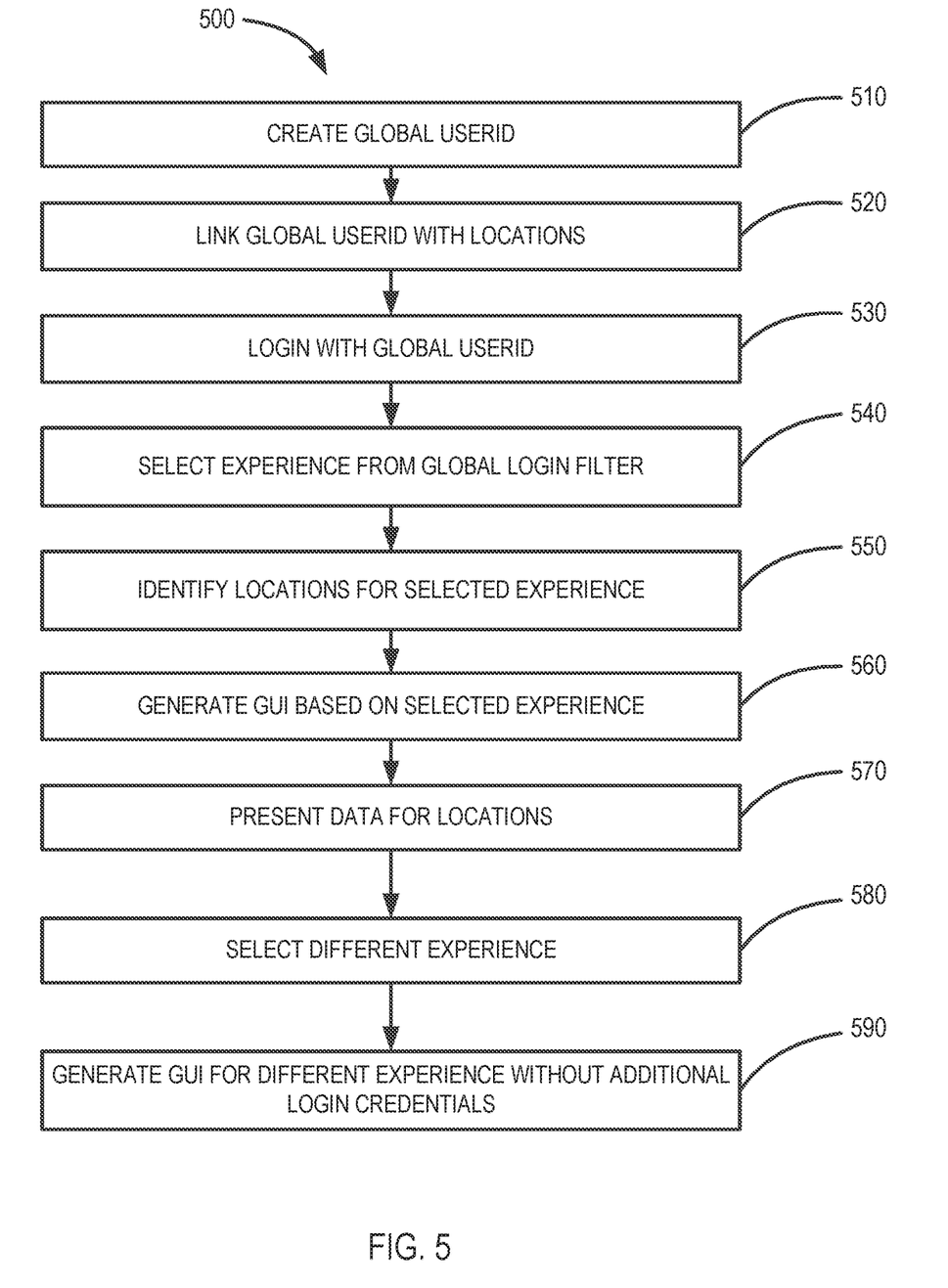
FIG. 5 illustrates a flowchart of a process for accessing data for multiple locations, in accordance with various embodiments.

Referring to FIG. 5, a flowchart 500 of a process for accessing data for multiple locations via an application portal is illustrated according to various embodiments. A user may create a global userID (step 510). The global userID may include a username and password. In various embodiments, the user may be an employee of a merchant which has a relationship with a transaction account issuer. The global userID may be linked with a plurality of locations (step 520). In various embodiments, the locations may be brick and mortar locations for the merchant. In various embodiments, the user may link the global userID with the plurality of locations by entering the username and password for each of the specific locations. In various embodiments, the transaction account issuer may verify that the global user ID is a verified account of the merchant, and the transaction account issuer may provide the global user ID access to all individual locations of the merchant.

The user may login to the application portal (step 530). The user may login by providing the login credentials for the global userID. The application portal may present a global login filter, and the user may select an experience from the global login filter (step 540). In various embodiments, the global userID may have a default experience, and the application portal may present the default experience to the user upon login, and the user may select a different experience if the user wishes a different experience.

In response to the user selecting an experience from the global login filter, the application portal may identify locations associated with the experience (step 550). In various embodiments, the locations may be associated with the experience in a location table. The application portal may generate a GUI based on the selected experience (step 560). The GUI may be tailored to relevant applications, languages, currencies, etc. for the selected experience. The application portal may obtain the data for the locations from a datastore. The GUI may present the data for the locations associated with the experience, such as the locations in the country represented by the selected experience (step 570). The GUI may also display a list or menu of available experiences.

The user may select a different experience (step 580). The application portal may generate a GUI for the different experience, including the data for the locations associated with the different experience (step 590). The GUI may display the format and content relevant to the newly selected experience. Thus, the application portal may allow the user to easily switch between location data for different locations in different countries or experiences without logging out and logging in for each location.

The application portal provides specific, structured graphical user interfaces with the described functionalities, which allow the user to easily switch between locations and experiences. Additionally, in various embodiments, the application portal may update dynamically, such that as new data becomes available to the application portal, such as a merchant receiving a new dispute, the location data may be updated in real time, or near real time.

Thus, by creating and global userIDs which are linked to multiple locations and multiple environments, users may access data for many locations in a corporate network without being required to log out and log in for each location, or to maintain a large quantity of usernames and passwords.

The systems may combine filtering tools in a manner that avoids their known drawbacks. The system may avoid being modified or thwarted by a computer literate end-user, and avoid being installed on and dependent on individual end-user hardware and operating systems or tied to a single local area network or a local server platform, because the filter may operate in a cloud network. The system may provide individually customizable filtering at the cloud level by taking advantage of the technical capability of certain communication networks.

The system may operate in a cloud network that associates each global user account with one or more filtering schemes and at least one set of filtering elements from a plurality of sets of filtering elements, thereby allowing global user accounts to customize the locations and experiences associated with the account.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The disclosure and claims do not describe only a particular outcome of providing access to location data, but the disclosure and claims include specific rules for implementing the outcome of providing access to location data and that render information into a specific format that is then used and applied to create the desired results of providing access to location data, as set forth in *McRO, Inc.* v. *Bandai Namco Games America Inc.* (Fed. Cir. case number 15-1080, Sep. 13, 2016). In other words, the outcome of providing access to location data can be performed by many different types of rules and combinations of rules, and this disclosure includes various embodiments with specific rules. While the absence of complete preemption may not guarantee that a claim is eligible, the disclosure does not sufficiently preempt the field of providing access to location data at all. The disclosure acts to narrow, confine, and otherwise tie down the disclosure so as not to cover the general abstract idea of just providing access to location data. Significantly, other systems and methods exist for providing access to location data, so it would be inappropriate to assert that the claimed invention preempts the field or monopolizes the basic tools of providing access to location data. In other words, the disclosure will not prevent others from providing access to location data, because other systems are already performing the functionality in different ways than the claimed invention. Moreover, the claimed invention includes an inventive concept that may be found in the non-conventional and non-generic arrangement of known, conventional pieces, in conformance with *Bascom* v. *AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

A record of charge (or "ROC") may comprise any transaction or transaction data. The ROC may be a unique identifier associated with a transaction. Record of Charge (ROC) data includes important information and enhanced data. For example, a ROC may contain details such as location, merchant name or identifier, transaction amount, transaction date, account number, account security pin or code, account expiry date, and the like for the transaction. Such enhanced data increases the accuracy of matching the transaction data to the receipt data. Such enhanced ROC data is NOT equivalent to transaction entries from a banking statement or transaction account statement, which is very limited to basic data about a transaction. Furthermore, a ROC is provided by a different source, namely the ROC is provided by the merchant to the transaction processor. In that regard, the ROC is a unique identifier associated with a particular transaction. A ROC is often associated with a Summary of Charges (SOC). The ROCs and SOCs include information provided by the merchant to the transaction processor, and the ROCs and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, Facebook, Twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A client, or web client, includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk.

All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising
   receiving, by a computer-based system, login credentials comprising a global user identification, wherein the global user identification is associated with a plurality of individual locations;
   receiving, by the computer-based system, a selection of an experience representing a geographical region from amongst a plurality of different geographical regions;
   identifying, by the computer-based system, a subset of the plurality of individual locations that are contained within the geographical region;
   generating, by the computer-based system, a graphical user interface tailored to the selected experience, wherein the graphical user interface provides access to a collection of application services that are associated with the subset of the plurality of individual locations for the selected experience;
   presenting, by the computer-based system and in the graphical user interface, data for the subset of the plurality of individual locations;
   receiving, by the computer-based system, a selection of a different experience, wherein the different experience represents a different geographical region from amongst the plurality of different geographical regions;
   identifying, by the computer-based system, a different subset of the plurality of individual locations that are contained within the different geographical region;
   generating, by the computer-based system, a new graphical user interface that is tailored to the selected different experience, wherein the new graphical user interface is generated without receiving additional login credentials; and
   presenting, by the computer-based system, data for the different subset.

2. The method of claim 1, wherein the experience identifies a country in which the subset of the plurality of individual locations are located.

3. The method of claim 1, wherein the experience specifies a currency for the subset of the plurality of individual locations.

4. The method of claim 1, wherein the new graphical user interface provides access to a new collection of application services that are associated with the different subset of the plurality of individual locations for the selected different experience.

5. The method of claim 1, wherein the collection of application services comprise at least one of a payments application service that provides information on recent payments received by a location, a disputes application service that provides information on transactions currently under dispute in a location, a supplies application service that provides an interface to order supplies for a location, and a lending application service that provides an interface to request a business loan for a location, wherein content of a graphical user interface that is tailored to the selected experience is displayed in a language associated with the selected experience.

6. The method of claim 5, wherein the content comprises payment data such that the payment data is displayed in a currency format associated with the selected experience.

7. The method of claim 1, wherein the global user identification comprises an account of a merchant and the plurality of individual locations correspond to physical locations of the merchant.

8. A system comprising:
a processor,
a tangible, non-transitory memory configured to communicate with the processor,
the tangible, non-transitory memory having instructions stored thereon that, in response to execution by the processor, cause the processor to perform operations compromising:
receiving login credentials comprising a global user identification, wherein the global user identification is associated with a plurality of individual locations;
receiving, a selection of an experience representing a geographical region from amongst a plurality of different geographical regions;
identifying a subset of the plurality of individual locations that are contained within the geographical region;
generating a graphical user interface tailored to the selected experience, wherein the graphical user interface provides access to a collection of application services that are associated with the subset of the plurality of individual locations for the selected experience;
presenting, in the graphical user interface, data for the subset of the plurality of individual locations;
receiving a selection of a different experience, wherein the different experience represents a different geographical region from amongst the plurality of different geographical regions;
identifying a different subset of the plurality of individual locations that are contained within the different geographical region;
generating a new graphical user interface that is tailored to the selected different experience, wherein the new graphical user interface is generated without receiving additional login credentials; and
presenting data for the different subset.

9. The system of claim 8, wherein the experience identifies a country in which the subset of the plurality of individual locations are located.

10. The system of claim 8, wherein the experience specifies a currency for the subset of the plurality of individual locations.

11. The system of claim 8, wherein the new graphical user interface provides access to a new collection of application services that are associated with the different subset of the plurality of individual locations for the selected different experience.

12. The system of claim 11, wherein the collection of application services comprise at least one of a payments application service that provides information on recent payments received by a location, a disputes application service that provides information on transactions currently under dispute in a location, a supplies application service that provides an interface to order supplies for a location, and a lending application service that provides an interface to request a business loan for a location wherein the graphical user interface prohibits access to an application service that is not available for the geographic region represented by the selected experience.

13. An article of manufacture including a non-transitory, tangible computer readable storage medium having instructions stored thereon that, in response to execution by a computer-based system, cause the computer-based system to perform operations comprising:
receiving login credentials comprising a global user identification, wherein the global user identification is associated with a plurality of individual locations;
receiving, a selection of an experience representing a geographical region from amongst a plurality of different geographical regions;
identifying, a subset of the plurality of individual locations that are contained within the geographical region;
generating a graphical user interface tailored to the selected experience, wherein the graphical user interface provides access to a collection of application services that are associated with the subset of the plurality of individual locations for the selected experience;
presenting, in the graphical user interface, data for the subset of the plurality of individual locations;
receiving a selection of a different experience, wherein the different experience represents a different geographical region from amongst the plurality of different geographical regions;
identifying a different subset of the plurality of individual locations that are contained within the different geographical region;
generating a new graphical user interface that is tailored to the selected different experience, wherein the new graphical user interface is generated without receiving additional login credentials; and
presenting data for the different subset.

14. The article of manufacture of claim 13, wherein the experience identifies a country in which the subset of the plurality of individual locations are located.

15. The system of claim 8, wherein content of a graphical user interface that is tailored to the selected experience is displayed in a currency format associated with the selected experience.

16. The system of claim 8, wherein the global user identification comprises an account of a merchant and the plurality of individual locations correspond to physical locations of the merchant.

17. The article of manufacture of claim 13, wherein the new graphical user interface provides access to a new collection of application services that are associated with the different subset of the plurality of individual locations for the selected different experience.

18. The article of manufacture of claim 13, wherein the operations further comprise switching between the data for the different geographical regions represented by different experiences without logging out of and logging in for each different experience.

19. The article of manufacture of claim 18, wherein the collection of application services comprise a disputes application service that provides information on transactions currently under dispute at different locations, a payments application service that provides information on recent payments received by a location, a supplies application service that provides an interface to order supplies for a location, and a lending application service that provides an interface to request a business loan for a location.

20. The article of manufacture of claim 19, wherein the global user identification comprises an account of a merchant and the plurality of individual locations correspond to physical locations of the merchant.

* * * * *